June 12, 1928. 1,673,027
J. S. THOMPSON
FRICTION BRAKE
Filed March 18, 1926  3 Sheets-Sheet 1

Inventor
James S. Thompson
By Wm. C. Bell
Atty.

June 12, 1928.  
J. S. THOMPSON  
1,673,027  
FRICTION BRAKE  
Filed March 18, 1926  
3 Sheets-Sheet 2
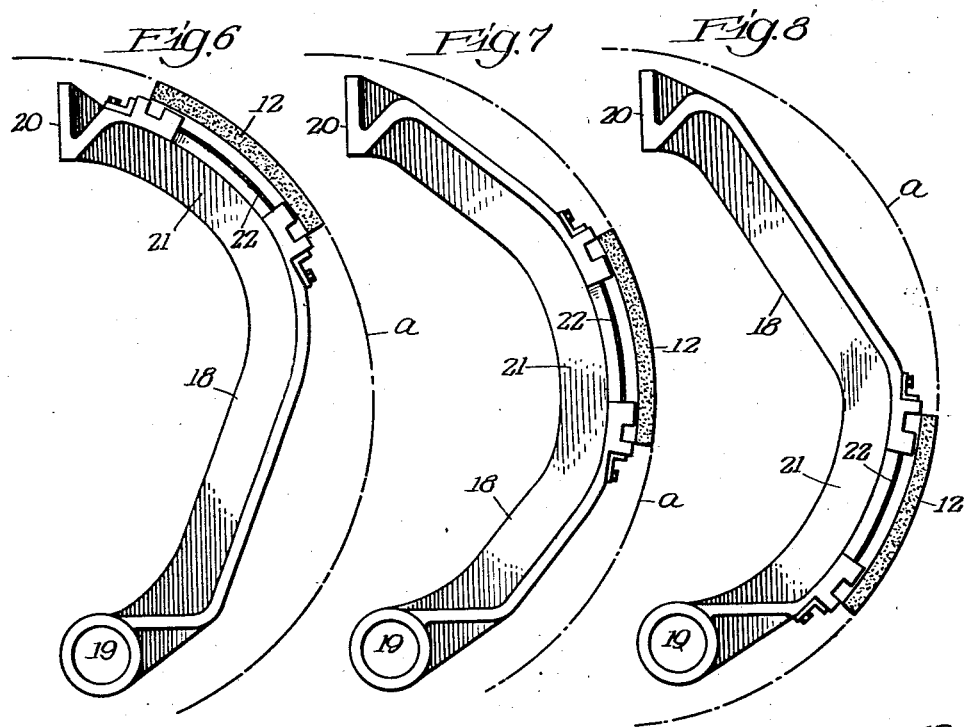
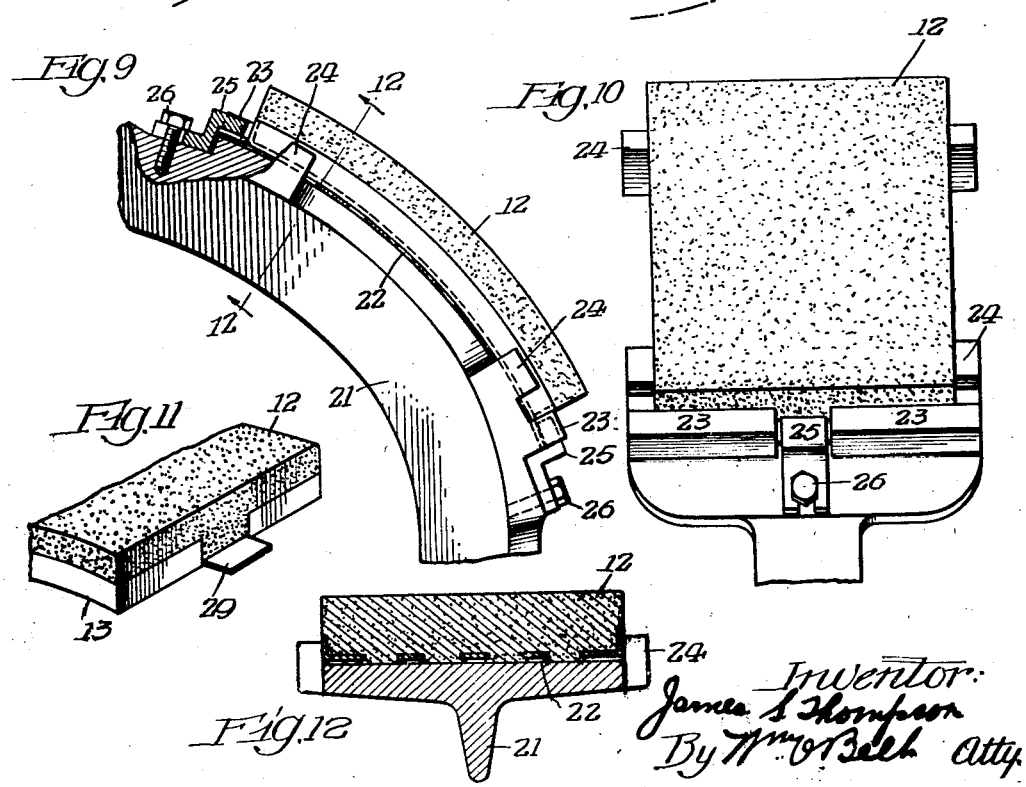

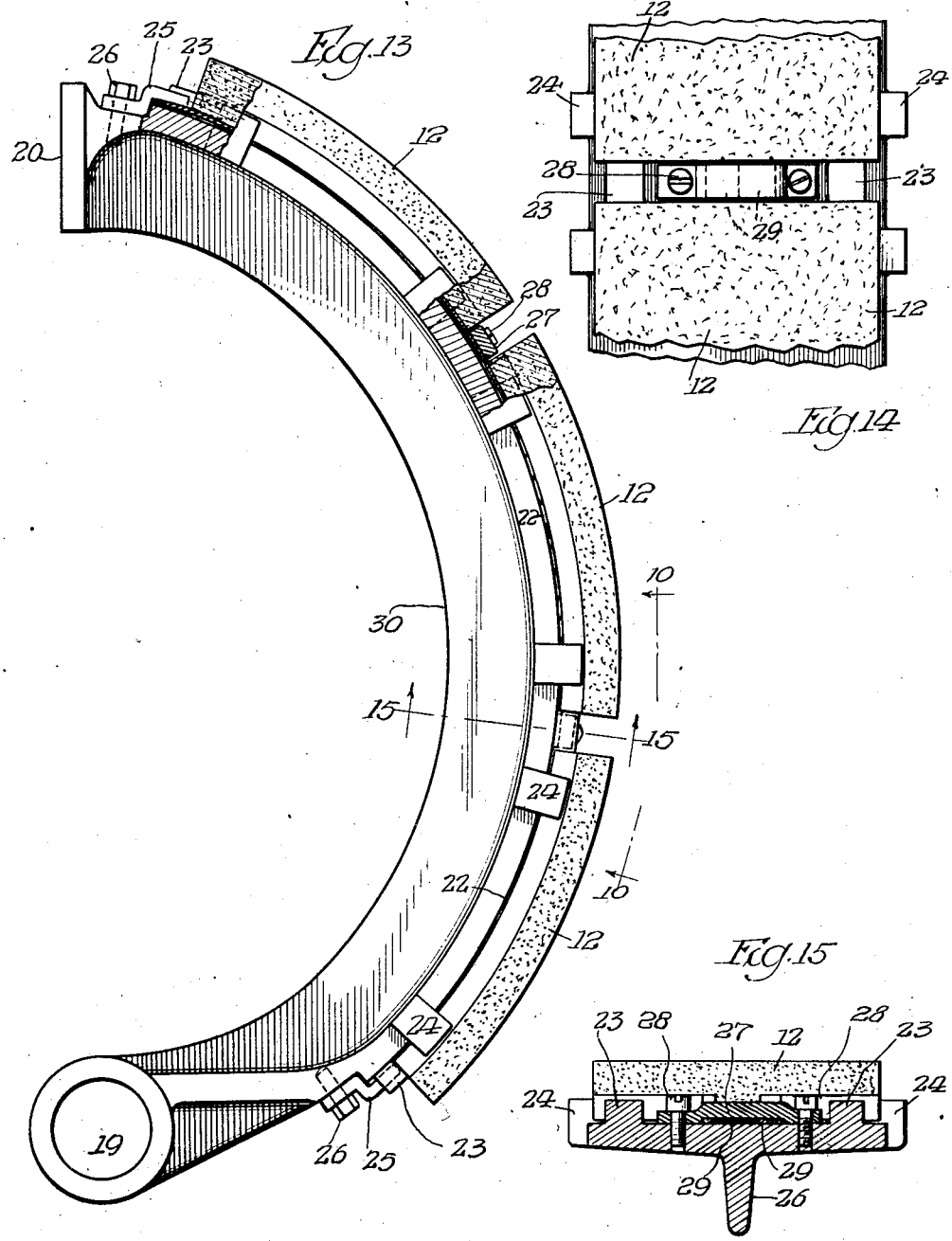

Patented June 12, 1928.

1,673,027

UNITED STATES PATENT OFFICE.

JAMES S. THOMPSON, OF NEW YORK, N. Y., ASSIGNOR TO AMERICAN BRAKE MATERIALS CORPORATION, OF NEW YORK, N. Y., A CORPORATION OF NEW YORK.

FRICTION BRAKE.

Application filed March 18, 1926. Serial No. 95,603.

This invention relates to friction brakes and while it is particularly adapted for expanding brakes arranged to make frictional contact with a drum, which is a form of brake very commonly employed in automotive vehicles, it is also useful in many other installations, as will be apparent to those skilled in the art.

The object of the invention is to provide a novel brake of simple and substantial construction comprising a shoe and means for holding the shoe upon its seat on the brake head against accidental displacement.

Another object of the invention is to provide a composition shoe which is not only adapted to make friction contact with the part to be braked, but also with the head which carries the shoe.

And a further object is to provide simple and efficient means for securing the shoe or shoes on the brake head.

In the accompanying drawings I have illustrated selected embodiments of the invention and referring thereto;

Figs. 6, 7 and 8 are elevations of heads showing shoes in different positions thereon.

Fig. 9 is an enlarged view partly in section of a portion of any one of these heads with a shoe thereon.

Fig. 10 is a plan view of Fig. 9.

Fig. 11 is a detail perspective view of one end of a shoe.

Fig. 12 is a transverse sectional view on the line 12—12 of Fig. 9.

Fig. 13 is an elevation of a head with three shoes thereon.

Fig. 14 is a plan view of a portion of Fig. 13.

Fig. 15 is a transverse sectional view on the line 15—15 of Fig. 13.

The body 12 of the shoe is made in arcuate form of a suitable composition which will provide friction sufficient for the intended purpose and which is wear and heat resistant. I do not claim the composition in this application because this invention is not restricted to a shoe having a body made of a particular composition, but is capable of use with a body formed of any composition of the kind indicated and suitable for the purpose.

Figure 1:
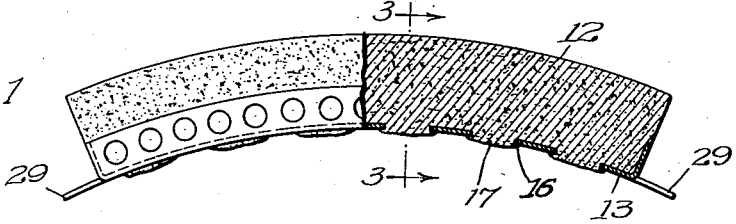
Fig. 1 is a side elevation of a shoe, partly in section, having a metal back in the form of a shell.
Figure 2:
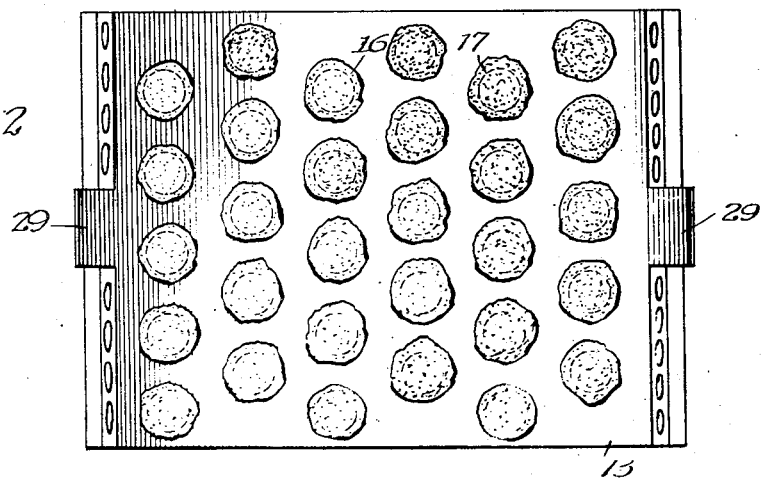
Fig. 2 is a bottom plan view of the shoe shown in Fig. 1.
Figure 3:
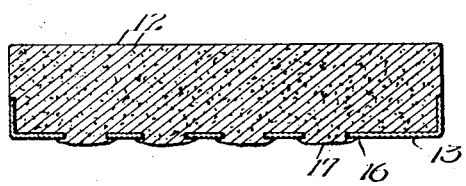
Fig. 3 is a transverse sectional view on the line 3—3 of Fig. 1.
Figure 4:
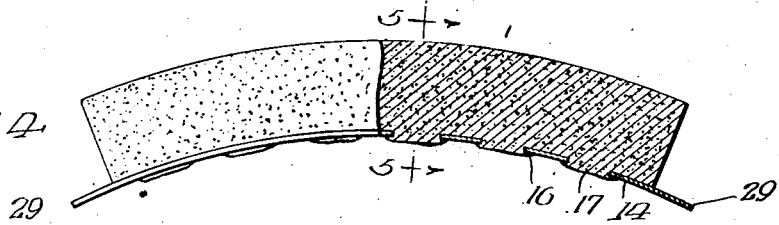
Fig. 4 is a side elevation, partly in section, of a shoe having a metal back in the form of a plate.
Figure 5:
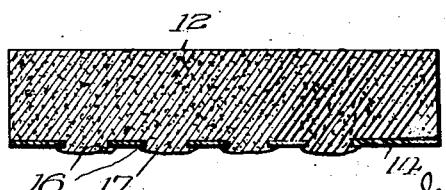
Fig. 5 is a transverse sectional view on the line 5—5 of Fig. 4.

A metal back is made fast to the concave back of the body 12 and it may be made in the form of a shell 13 with sides or ends or sides and ends, Figs. 1–3; or it may be a plate 14, Figs. 4–5. The body is molded on the back under pressure to secure the parts together and the back is provided with perforations 16 to permit parts of the composition body to be pressed therethrough and spread out around the edge of each perforation upon the outer face of the back which constitutes the back of the shoe. The effect of this is to form rivet heads 17 of the composition at each perforation on the back of the shoe. I do not consider it absolutely essential that the composition shoe spread at the concave back of the shoe beyond the edges of the perforations, or to any material extent beyond the outer surface of the metal back; but it is desirable to have the composition project outward beyond the surface of the back a little to form buttons of composition on the metal back of the shoe, and it does no harm but increases the aggregate surface area of these buttons to permit them to spread out in the form of rivet heads around the perforation, as shown in Fig. 2.

The sides and ends of the shell back may also be perforated to receive parts of the composition body for securing the body and the shell together, as shown in Figs. 1 and 2, but this is not necessary and I have shown shells with unperforated sides in Figs. 6, 7, 8 and 9 and 13; and a shell with unperforated sides and ends in Fig. 11; and in Fig. 10 I have shown a shoe with a plate back like that shown in Figs. 4 and 5, without sides or ends.

For an internal expansion brake for automotive vehicles a single shoe 12 is mounted upon a skeleton head comprising an arm 18 having an eye 19 at one end for engagement with a stud of a brake assembly (not shown) the free end 20 to be engaged by the brake operating means, and a curved shoe section 21 upon which the shoe 12 is mounted and is carried by the head into and out of frictional contact with the drum indicated by the broken line of the brake assembly. The head has a curved seat 22 to receive the shoe and this seat for a single shoe may be located adjacent either end of the head or midway between the ends of the head, as shown in Figs. 6-8. I prefer to provide for a shoe of the type shown in Figs. 1-5 a broad plane curved seat 22 approximating the size and shape of the back of the shoe, which conforms to the curvature of the seat. The composition buttons 17 at the back of the shoe make frictional contact with the seat on the head and prevent whatever tendency there may be of the shoe to move on its seat. I may provide stops 23 at the ends of the seat and guides 24 at the sides of the seat to engage the ends and sides of the shoe and prevent endwise or sidewise movement thereof, but I do not believe this will be necessary where buttons 17 having a relatively large aggregate contact area are provided because these buttons will frictionally grip the seat and prevent movement of the shoe which might otherwise occur under ordinary conditions of service. End stops and side guides may be provided as an added precaution against movement of the shoe on its seat under unusual conditions.

I prefer to provide fastening means for securing the shoe on its seat against outward movement therefrom. In some installations there may be no material tendency of the shoe to move outward from its seat, but in other installations it may be necessary to secure the shoe snugly to its seat to prevent the shoe from dragging on the surface to be braked. Therefore, I provide fastening means comprising clamps 25 which engage the shoe and are secured by bolts 26 to the head. These clamps may be angular in shape and extend in the general direction of the length of the arm, as shown in Fig. 9. But where a plurality of shoes are mounted upon the head I prefer to use the angle clamps 25 at the outer ends of the set of shoes and a transverse clamp 27, which is fastened by bolts 28 to the head between opposing ends of adjacent shoes. A single transverse clamp 27 will engage two shoes and serve the purpose of two such clamps as 25, occupying less room and enabling the shoes to be seated close together.

Provision may be made for engaging the clamps with the shoe in any suitable manner. In the drawings I have shown the back of the shoe provided with end projections 29, which are engaged by the clamps to secured the shoe to the head. The projections 29 may be located midway between the sides of the shoe and the clamps 25 will be located on the heads in a position to engage the projections; but the projections may be offset a little from the middle of the ends of the shoe, as indicated in Fig. 15 so that projections on the opposing ends of adjacent shoes will lie side by side to be engaged by a single transverse clamp 27. When the projections are not centrally located at the end of the shoe, as just described, the single clamps 25 will be made of sufficient size, or they will be located at a corresponding position on the heads to engage the offset projections. The double clamp 27 is also angular in shape to receive the projections 29, 29 so that the clamp may be snugly secured to the head by the bolts.

In Figs. 13-15 I have shown a head 30 having three shoe seats 22 thereon arranged end to end in relatively closed relation and adapted to receive three shoes 12, which are secured thereon in the manner and by the means hereinbefore described. With this head one shoe or two shoes or three shoes may be used and two shoes may be located in adjacent relation with the empty seat adjacent the pivot end or the free end of the head, or the two shoes may be spaced apart with the empty seat between the shoes. Where the head is made to receive a plurality of shoes it will only be necessary to provide one set of end stops for engagement by the opposing ends of adjacent shoes, if any end stops are provided.

My invention provides for holding the shoe in fixed position on the head and relieves the fastening and other devices of the head from jolts, jars and strains to which they might be subjected if the tendency of the head to shift position on its seat under conditions of service were not otherwise restrained. For many purposes the stops, the guides, and the clamps may be sufficient to hold the shoe in proper position on the head, but the body projections on the concave back of the concavo-convex shoes practically "freezes" the shoe to its seat by frictional contact between the back of the shoe and the seat and prevents any tendency of the shoe to creep or to move under an application of the brake. The invention is a refinement in this art which I believe will be desirable because, in a simple and efficient manner, it prevents any tendency of the shoe to move on its seat under an application of the brake and relieves the other parts of any strains to which they might otherwise be subjected.

I have shown the shoe applied to brake heads of several different forms for which it is adapted, but I do not wish to be understood thereby as confining the invention to these particular heads for it is apparent that it may be used with other heads with which it is adapted to function. The perforations in the back of the shoe may be of any size and any number and they may be arranged in any manner desired; but I prefer to stagger the perforations so that the parts of the body projecting therethrough will form a discontinuous friction contact surface of staggered buttons or spots distributed over the back of the shoe. It is not necessary that there should be any great amount of the body composition in these buttons at the back of the shoe because there will be no relative movement between the seat and the buttons and therefore no material wear of the buttons. The shoes are preferably made reversible to facilitate installation and also to permit the shoes to be reversed, if for any reason they do not wear uniformly. As heretofore indicated it may be sufficient for any purposes not to provide for any spreading of the spots of body composition on the back of the shoe beyond the edges of the perforations because spots within the edges of the perforations will furnish ample friction contact surface for many installations. Also it may not be necessary to project the body composition through the perforations beyond the outer surface of the metal back, because projections of the body flush with the surface of the metal back will provide sufficient friction contact with the seat for many installations.

Various changes in the form, construction and arrangement of parts and other adaptations of the invention than those illustrated and described may be made without departing from the spirit or sacrificing the advantages of the invention and I reserve the right to make all such changes as fairly fall within the scope of the following claims:

I claim:

1. A composition friction brake shoe of arcuate shape and having friction contact surfaces on its convex and concave faces and an intermediate back member.

2. A frictional brake shoe comprising a continuous composition body having a discontinuous friction contact surface on its back face.

3. A composition friction brake shoe having a continuous friction contact surface on one face and a discontinuous friction contact surface on its opposite face.

4. A composition friction brake shoe of arcuate shape having a continuous friction contact surface on its convex face and a discontinuous friction contact surface on its concave face.

5. A friction brake shoe comprising a continuous composition body having a friction contact surface on one face formed of spaced spots of said composition.

6. A friction brake shoe comprising a continuous composition body having a friction contact surface on one face formed of spaced spots of said composition arranged in staggered relation.

7. A friction brake shoe comprising a continuous composition body and a perforated back thereon, parts of the body being embedded in the perforations of the back and forming a discontinuous friction contact surface on the back of the shoe.

8. A friction brake shoe comprising a continuous composition body and a perforated back thereon, parts of the body extending through the perforations in the back and beyond the outer surface of the back and forming a discontinuous friction contact surface on the back of the shoe.

9. A friction brake shoe comprising a continuous composition body and a perforated back thereon, parts of the body extending through the perforations in the back and being spread out on the back around the edges of the perforations to form a friction contact surface on the back of the shoe.

10. A friction brake shoe comprising a continuous composition body and a perforated back thereon, parts of the body extending through the perforations in the back and being spread out on the back around the edges of the perforations and extending beyond the outer surface of said back to form a discontinuous friction contact surface.

11. A friction brake shoe comprising a continuous composition body and a back thereon having staggered perforations therein, parts of the body extending through said perforations and forming a discontinuous friction contact surface of staggered parts of the body on the back of the shoe.

12. A composition friction brake shoe having friction contact surfaces on opposite sides thereof, and a metal back member having means at its ends for securing the shoe to a brake head.

13. A composition friction brake shoe having a continuous contact surface on its front face and a discontinuous friction contact surface on its back face, and means at its ends for securing a shoe to a brake head.

14. A friction brake shoe comprising a composition body, a perforated metal back on the body, parts of the body being embedded in the perforations of the back and forming a discontinuous friction contact surface on the back of the shoe, and means at the ends of the back for securing the shoe to a brake head.

15. A friction brake shoe comprising a composition body and a perforated metal back thereon parts of the body being embedded in the perforations of the back and forming a discontinuous friction contact surface on the back of the shoe, and projections at the ends of the metal back for securing the shoe to a brake head.

16. A friction brake shoe comprising a composition body, a metal shell on the back of the body and having perforations in its back to receive parts of the composition body to form a discontinuous friction contact surface on the back of the shoe and projections at the ends of the shell for securing the shoe to a brake head.

17. The combination of a brake head having a shoe seat thereon, a shoe having a friction contact surface to engage said seat, and means for detachably securing the shoe on the seat.

18. The combination of a brake head having a shoe seat thereon, a shoe having a discontinuous friction contact surface at its back to engage said seat, and means for detachably securing the shoe on the seat.

19. The combination of a brake head having a curved plane shoe seat thereon, an arcuate shoe having a discontinuous friction contact surface on its convex face to engage said seat, and means for detachably securing the shoe on the seat.

20. The combination of a brake head having a shoe seat thereon, a composition shoe of arcuate form having a continuous friction contact surface on its convex face and a discontinuous friction contact surface on its concave face to engage said seat, and means for securing the shoe on said seat.

21. The combination of a brake head having a shoe seat thereon, a shoe having a composition body and a metal back on the body, said shoe being perforated and parts of the back projecting through said perforations to form a discontinuous friction contact surface to engage said seat, and means for detachably securing the shoe on the seat.

22. The combination of a brake head having a shoe seat thereon, a shoe comprising a composition body and a perforated metal back, parts of the body projecting through said perforations to form a discontinuous friction contact surface on the back of the shoe to engage said seat, projections at the ends of the shoe, and means engaging said projections to secure the shoe on the seat.

23. The combination of a brake head having a plurality of shoe seats thereon, friction shoes on said seats, projections on the opposing ends of adjacent shoes arranged side by side, and clamps overlapping said projections and secured to said head.

24. The combination of a brake head having a plurality of shoe seats thereon, shoes having discontinuous friction surfaces at the back thereof to engage said seats, projections at the opposing ends of adjacent shoes arranged side by side, and a clamp arranged between said adjacent shoes and overlapping said projections for securing the shoes to said head.

JAMES S. THOMPSON.